(12) United States Patent
Wu

(10) Patent No.: US 7,063,347 B1
(45) Date of Patent: Jun. 20, 2006

(54) MAIN SHAFT AND BOTTOM BRACKET MOUNTING ARRANGEMENT FOR GOLF CART

(76) Inventor: David Wu, No. 35-1, Jin Hsin Street, Tu Cheng City, Taipei Hsien (TW)

( * ) Notice: Subject to any disclaimer, the term of this patent is extended or adjusted under 35 U.S.C. 154(b) by 0 days.

(21) Appl. No.: 10/969,994

(22) Filed: Oct. 22, 2004

(51) Int. Cl.
*B62B 1/00* (2006.01)

(52) U.S. Cl. .................... 280/652; 280/40; 280/DIG. 6

(58) Field of Classification Search ............ 280/655.1, 280/655, 639, 642, 659, DIG. 5, DIG. 6; 403/83, 84, 98, 92, 95, 321, 326
See application file for complete search history.

(56) References Cited

U.S. PATENT DOCUMENTS

| | | | | |
|---|---|---|---|---|
| 4,452,327 A | * | 6/1984 | Mowat et al. | 280/DIG. 5 |
| 5,451,072 A | * | 9/1995 | Weng | 280/646 |
| 5,626,351 A | * | 5/1997 | Tsai | 280/655 |
| 6,048,037 A | * | 4/2000 | Cheng | 280/655 |
| 6,126,184 A | * | 10/2000 | Liao | 280/47.371 |
| 6,179,321 B1 | * | 1/2001 | Sun | 280/658 |
| 6,435,539 B1 | * | 8/2002 | Wu | 280/652 |
| 6,695,324 B1 | * | 2/2004 | Wu | 280/47.315 |
| 6,749,214 B1 | * | 6/2004 | Shieh | 280/651 |
| 2003/0222429 A1 | * | 12/2003 | Shieh | 280/651 |

* cited by examiner

*Primary Examiner*—Hau Phan
(74) *Attorney, Agent, or Firm*—Troxell Law Office, PLLC

(57) ABSTRACT

A main shaft and bottom bracket mounting arrangement for use in a golf cart is disclosed to include a bottom bracket holding a wheel axle with two wheels at the ends and a driving mechanism for rotating the wheels, a main shaft pivoted to a coupling frame at the bottom bracket, and a stop bar coupled to the coupling frame and supported on a spring member for locking the main shaft in the operative position and for enabling the main shaft to be turned out of the coupling frame to the collapsed position when the user pressed a press handle to lower the stop bar.

2 Claims, 7 Drawing Sheets

US 7,063,347 B1

MAIN SHAFT AND BOTTOM BRACKET MOUNTING ARRANGEMENT FOR GOLF CART

BACKGROUND AND SUMMARY OF THE INVENTION

The present invention relates to a golf cart and more particularly, to the main shaft and bottom bracket mounting arrangement of a golf cart, which allows the user to collapse the main shaft when the golf cart is not in use.

A conventional golf cart, as shown in FIG. 1, comprises a bottom bracket 91, a front wheel 911 pivotally provided at the front side of the bottom bracket 91, two rear wheels 912 pivotally provided at the rear side of the bottom bracket 91, and a driving mechanism 8 installed in the bottom bracket 91 for rotating the rear wheels 912. This structure of golf cart requires much storage space when not in use.

The present invention has been accomplished under the circumstances in view. It is therefore the main object of the present invention to provide a main shaft and bottom bracket mounting arrangement for use in a golf cart, which allows the user to collapse the main shaft so as to reduce the size of the golf cart for storage when the golf cart is not in use. It is another object of the present invention to provide a main shaft and bottom bracket mounting arrangement, which enables the user to unlock the main shaft conveniently with one single hand or leg. To achieve these and other objects of the present invention, the main shaft is directly pivoted to a coupling frame at a wheel axle supporting barrel at the bottom bracket and lockable by a stop bar, which is automatically shifted to the locking position by the spring power of a spring member to lock the main shaft in position when the user turned the main shaft from the non-operative position to the operative position. When not in use, the stop bar can be lowered to unlock the main shaft, for enabling the main shaft to be turned to the non-operative (collapsed) position to reduce the size of the golf cart. Further, a press handle is connected to one end of the stop bar and coupled to a cylindrical casing through a slip joint and supported on the aforesaid spring member. The user can use one single hand or one single leg to press the press handle and to further unlock the stop bar from the main shaft.

DETAILED DESCRIPTION OF THE INVENTION

Figure 1:
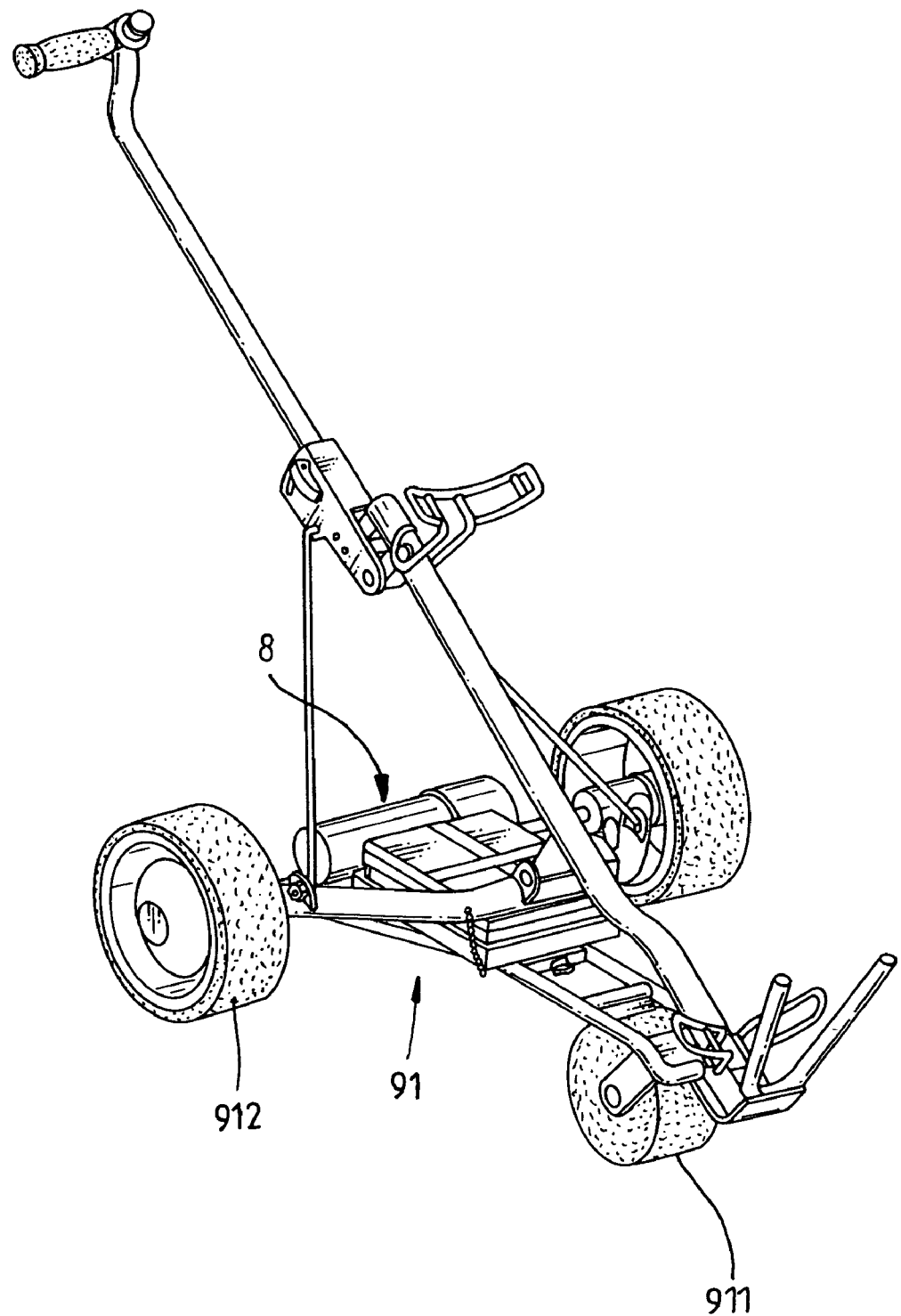
FIG. 1 is a perspective view of a conventional golf cart.
Figure 2:
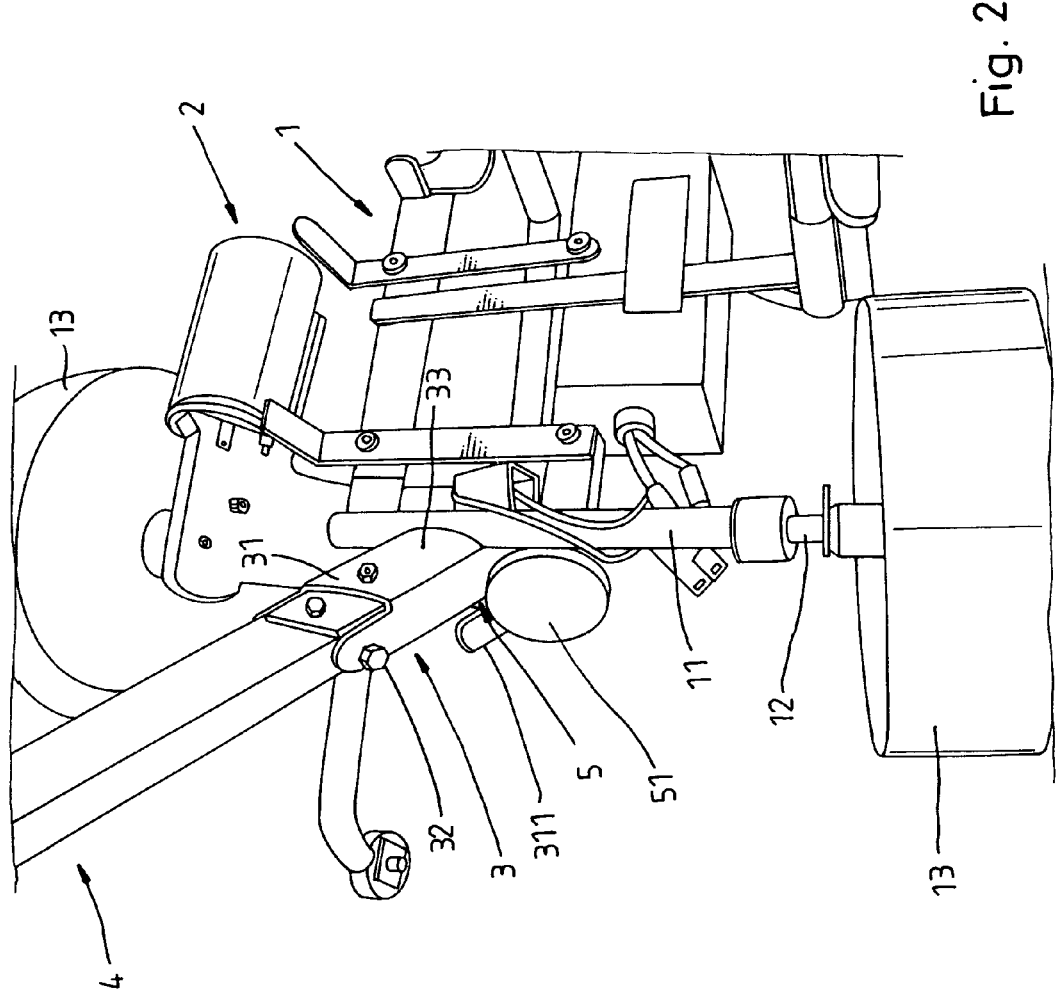
FIG. 2 is a perspective view of the preferred embodiment of the present invention.
Figure 3:
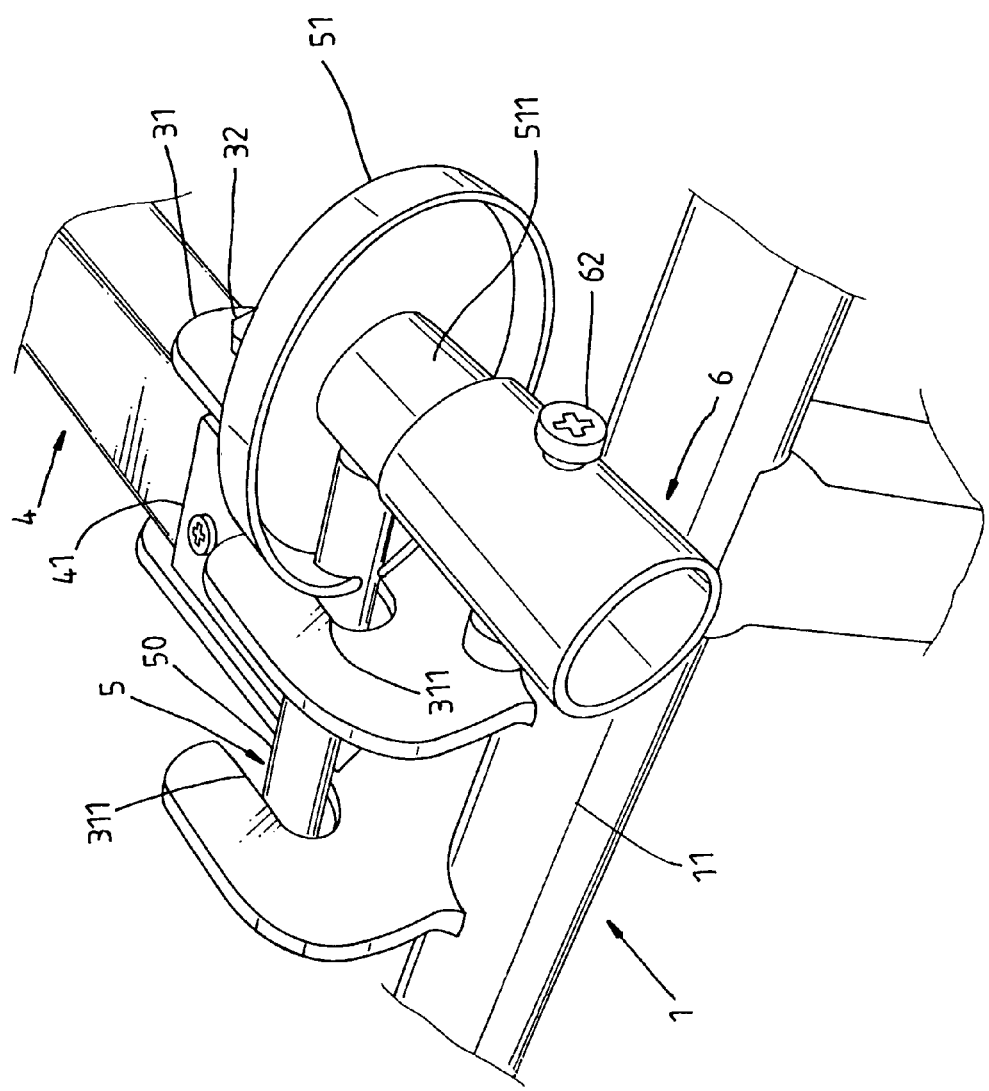
FIG. 3 is an enlarged view of a part of FIG. 2.
Figure 4:
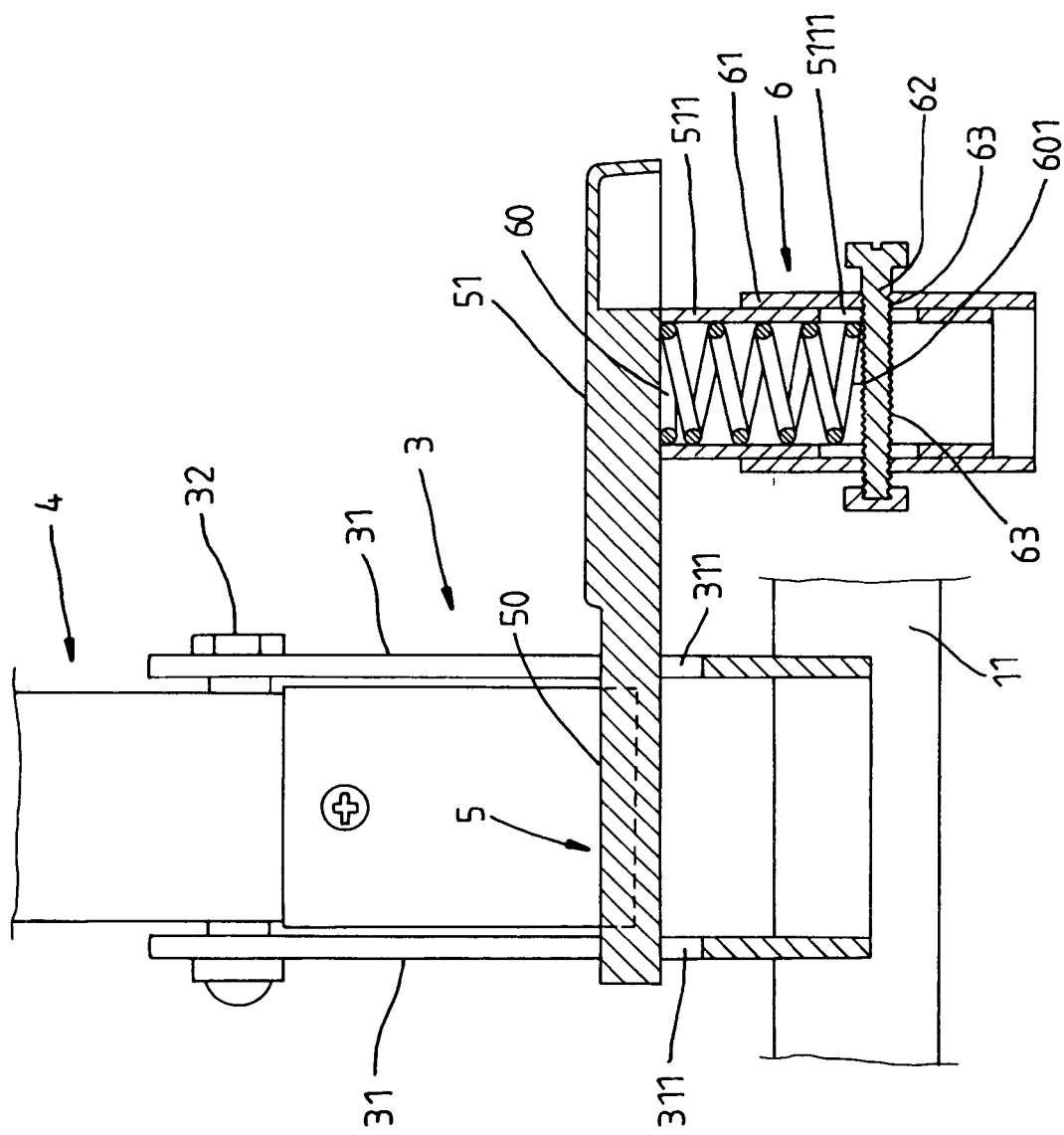
FIG. 4 is a sectional top view of FIG. 3.
Figure 5:
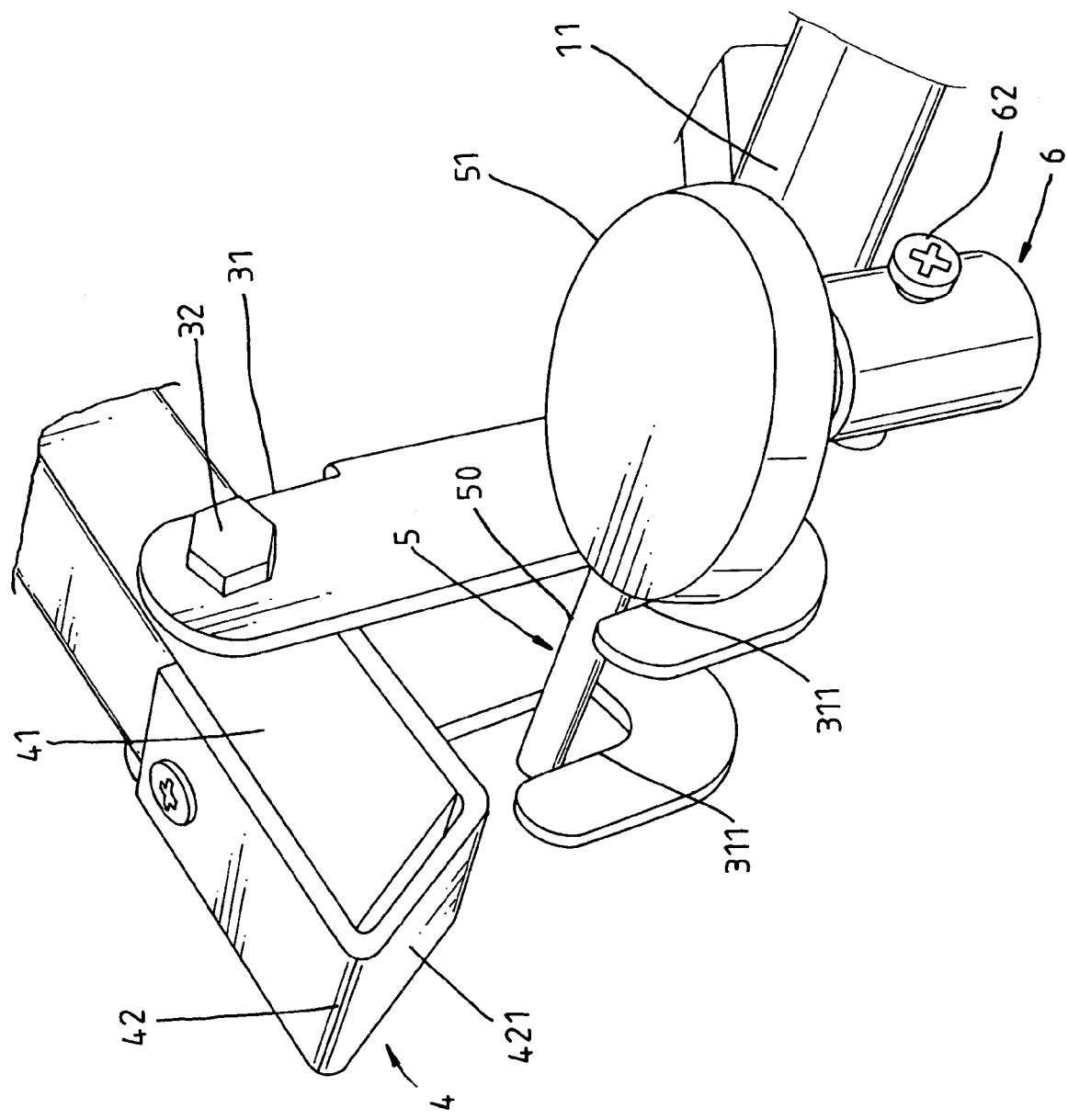
FIG. 5 is a perspective view of the present invention, showing the main shaft unlocked and turned out of the coupling frame toward the collapsed position.
Figure 6:
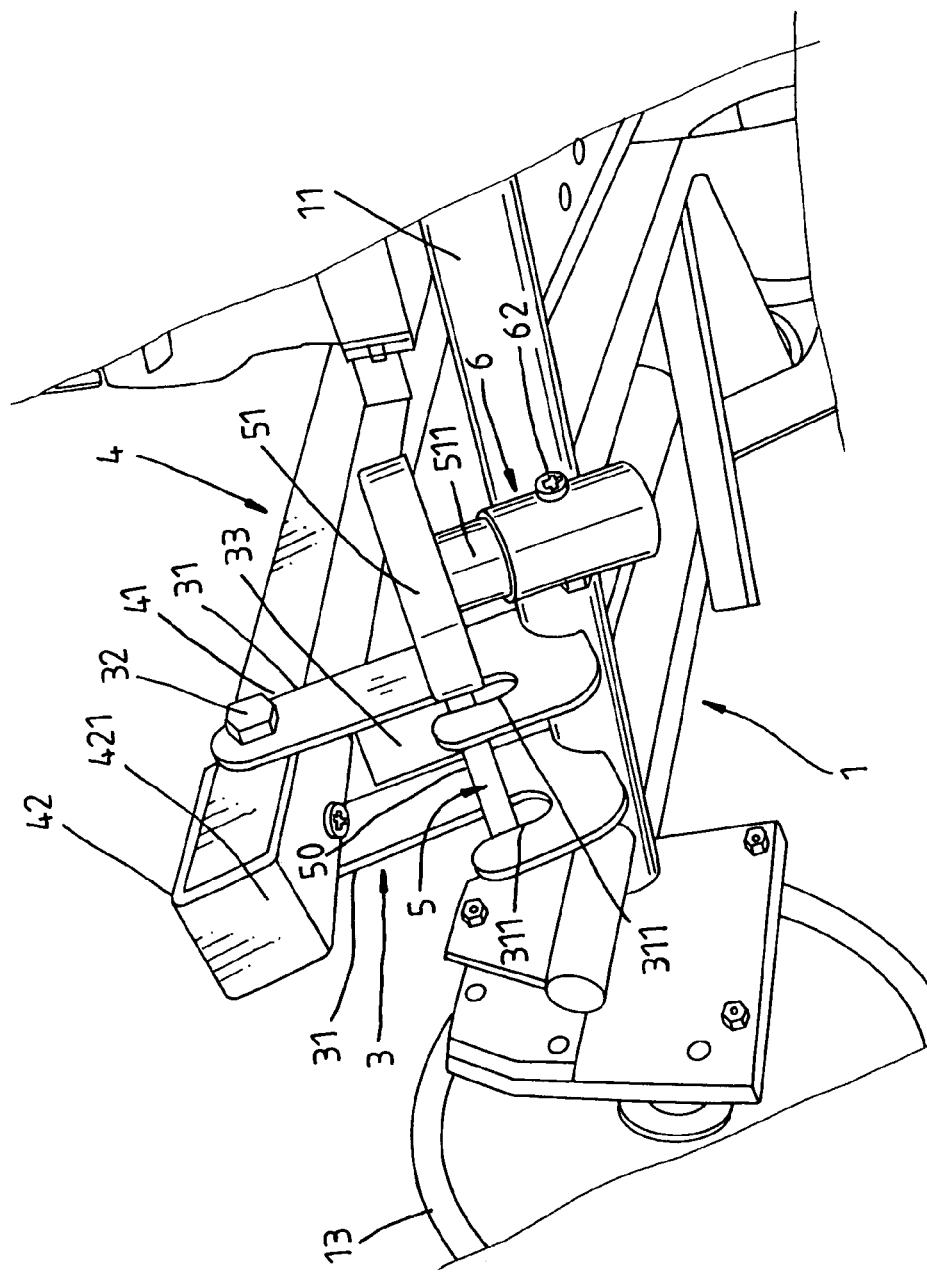
FIG. 6 is a perspective view of the present invention, showing the collapsed status of the main shaft.
Figure 7:
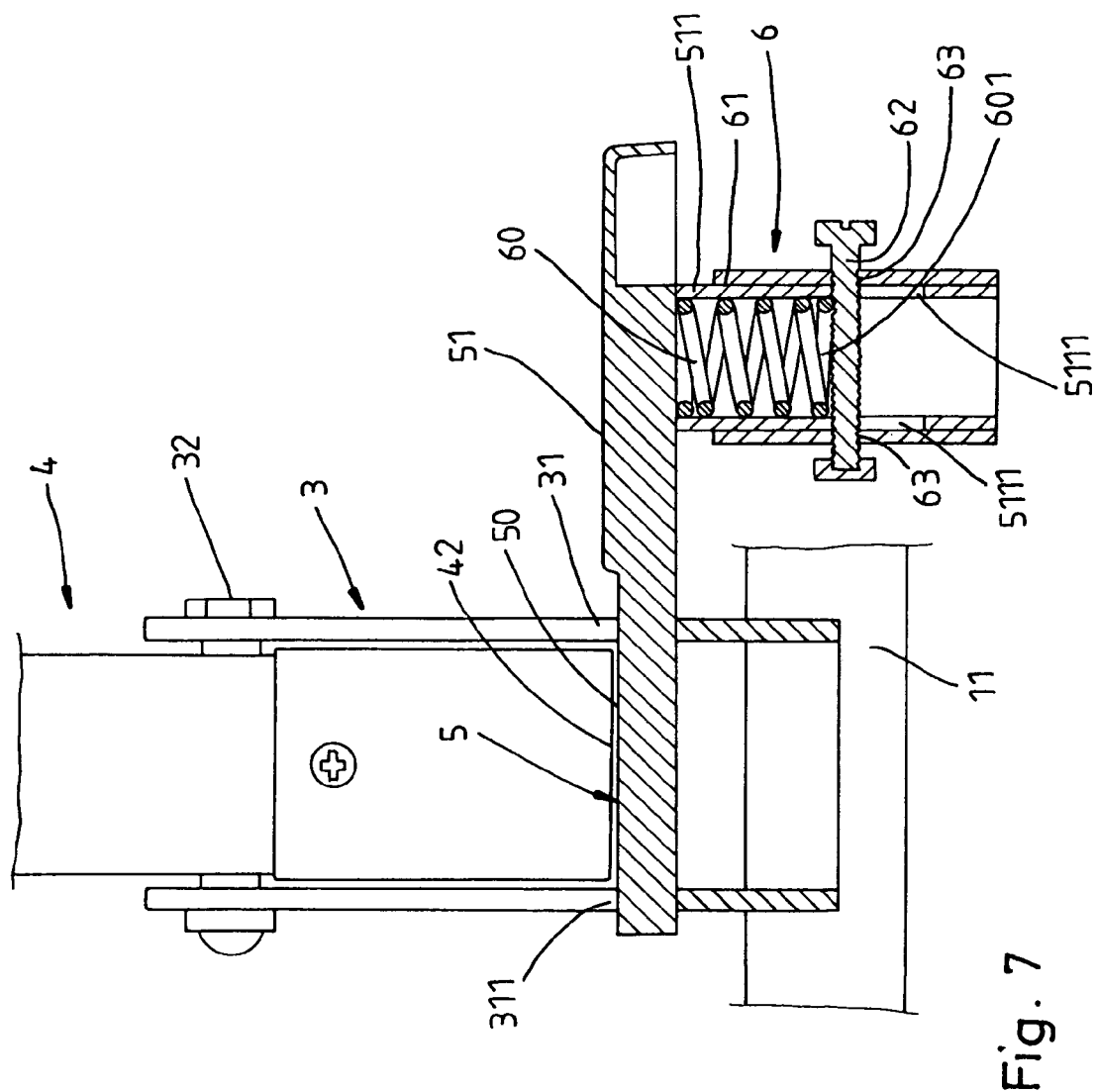
FIG. 7 is similar to FIG. 4 but showing the stop bar lowered to the unlocking position.

Referring to FIGS. 2~7, the bottom bracket, referenced by numeral 1, comprises a transversely extended sleeve 11. A wheel axle 12 is pivotally mounted in the sleeve 11 to support a wheel 13 at each of the two ends thereof. A driving mechanism 2 is installed in the bottom bracket 1, and adapted to rotate the wheels 13.

A coupling frame 3 is provided at the periphery of the sleeve 11 near one end. The coupling frame 3 comprises a top wall 33, and two parallel sidewalls 31 respectively perpendicularly extended from the two opposite lateral sides of the top wall 33 in same direction and pivotally connected to a part 41 near the bottom end 42 of a main shaft 4 by a pivot bolt 32. The parallel sidewalls 31 define a respective sliding groove 311, which extends in parallel to the extending direction of the top wall 33. A stop bar 5 is transversely inserted through the sliding groove 311, and movable along the sliding groove 311 between the locking position where the bottom end 42 of the main shaft 4 is stopped between the top wall 33 and the stop bar 5 (see FIGS. 3 and 5), and the unlocking position where the top side 50 of the stop bar 5 is spaced below the bottom end 42 of the main shaft 4 for enabling the main shaft 4 to be turned about the pivot bolt 32 relative to the coupling frame 3. A press handle 51 is connected to one end of the stop bar 5 outside the coupling frame 3. The press handle 51 has a bottom barrel 511 axially slidably inserted into the axially extended inside hole 61 of a cylindrical casing 6, which is fixedly connected to the periphery of the sleeve 11. The cylindrical casing 6 has two side holes 63 aligned at two sides. The bottom barrel 511 has two longitudinal sliding slots 5111 symmetrically disposed at two sides corresponding to the side holes 63. A pivot 62 is inserted through the longitudinal sliding slots 5111 of the bottom barrel 511 and fastened to the side holes 63 of the cylindrical casing 6 to secure the bottom barrel 511 to the cylindrical casing 5, for enabling the bottom barrel 511 to be moved axially in the cylindrical casing 6 within a limited distance corresponding to the length of the longitudinal sliding slots 5111. A spring member 60 is mounted inside the bottom barrel 511, having a bottom end 601 stopped at the pivot 62. The spring member 60 imparts an outward pressure to the press handle 51 relative to the cylindrical casing 6 to support the stop bar 5 in the locking position. When pressed the press handle 51 to compress the spring member 60, the stop bar 5 is lowered relative to the main shaft 4 from the locking position to the unlocking position to unlock the main shaft 4, for enabling the main shaft 4 to be turned about the pivot bolt 32 from the operative position to the non-operative (collapsed) position (see FIGS. 5~7).

Referring to FIG. 6 again, the bottom end 42 of the main shaft 4 has a beveled guide face 421 facing the stop bar 5 for enabling the main shaft 4 to be conveniently moved over the stop bar 5 between the operative position and the non-operative position.

As indicated above, the invention has the following features:

1. The main shaft 4 is directly pivoted to the coupling frame 3 at the wheel axle supporting barrel 11 and lockable by the stop bar 5, which is automatically shifted to the locking position by the spring power of the spring member 60 to lock the main shaft 4 in position when the user turned the main shaft 4 from the non-operative position to the operative position. When not in use, the stop bar 5 can be lowered to unlock the main shaft 4, for enabling the main shaft 4 to be turned to the non-operative (collapsed) position to reduce the size of the golf cart.

2. The user can use one single hand or one single leg to press the press handle 51, thereby unlocking the stop bar 5 from the main shaft 4.

While only one embodiment of the present invention has been shown and described, it will be understood that various modifications and changes could be made thereunto without departing from the spirit and scope of the invention disclosed.

What is claimed is:

1. A foldable golf cart comprising: a main shaft and a bottom bracket, said bottom bracket comprising a transversely extended sleeve, a wheel axle pivotally mounted in said transversely extended sleeve, two wheels respectively mounted on two distal ends of said wheel axle, a driving mechanism mounted on said bottom bracket and adapted to rotate said wheels, and a main shaft, said main shaft having a bottom end connected to said bottom bracket, wherein said bottom bracket comprises a coupling frame fixedly connected to the periphery of said transversely extended sleeve, said coupling frame comprising a front wall and two parallel sidewalls respectively perpendicularly extended from two opposite lateral sides of said front wall and pivotally connected to a part near the bottom end of said main shaft with a pivot bolt for enabling said main shaft to be turned about said pivot bolt between an operative position where the bottom end of said main shaft is stopped at the front wall of said coupling frame between said two parallel sidewalls of said coupling frame and a collapsed position, said parallel sidewalls each defining an elongated sliding groove, a stop bar mounted in and movable along the elongated sliding groove of said parallel sidewalls of said coupling frame between a locking position and an unlocking position to lock/unlock said main shaft, a cylindrical casing fixedly connected to the periphery of said transversely extended sleeve, a press handle connected to one end of said stop bar, said press handle having a bottom barrel coupled to said cylindrical casing through a slip joint, and a spring member mounted inside said bottom barrel and said cylindrical casing and supporting said press handle and said stop bar in said locking position.

2. The foldable golf cart according to claim 1, wherein the bottom end of said main shaft has a beveled guide face.

\* \* \* \* \*